United States Patent [19]

Shiga

[11] Patent Number: 4,701,046

[45] Date of Patent: Oct. 20, 1987

[54] METHOD OF PHOTOGRAPHING ON MICROFILM AND APPARATUS THEREFOR

[76] Inventor: Koji Shiga, 26-30, 2-chome, Nishi-Azabu, Minato-ku, Tokyo, Japan

[21] Appl. No.: 810,712

[22] Filed: Dec. 19, 1985

[30] Foreign Application Priority Data

Dec. 19, 1984 [JP] Japan ............... 59-268101
Dec. 19, 1984 [JP] Japan ............... 59-268102

[51] Int. Cl.[4] ............... G03B 27/32; G03B 27/52
[52] U.S. Cl. ............... 355/39; 355/40; 355/74
[58] Field of Search ............... 355/40, 39, 74

[56] References Cited

U.S. PATENT DOCUMENTS

| | | | |
|---|---|---|---|
| 3,202,045 | 8/1965 | Arsenault et al. | 355/40 |
| 3,674,365 | 7/1972 | Kohler et al. | 355/40 |
| 3,824,604 | 7/1974 | Stein | 355/40 |
| 4,087,175 | 5/1978 | Johnson | 355/40 |
| 4,174,174 | 11/1979 | Hunter et al. | 355/39 |
| 4,193,684 | 3/1980 | Armstrong | 355/40 |
| 4,218,133 | 8/1980 | Biedermann | 355/74 |
| 4,533,237 | 8/1985 | Stockburger et al. | 355/40 |

*Primary Examiner*—Monroe H. Hayes
*Attorney, Agent, or Firm*—Wenderoth, Lind & Ponack

[57] ABSTRACT

A method and apparatus for photographing images on a microfilm from a manuscript placed on a table together with additional information is arranged such that a photographing position for the manuscript is displaced from that for the additional information structurally. A format of blip marks, a frame size, and a counting system of the additional information are preset and the presetting of the frame size is effected with an actuation of a mask plate. The size of the additional information on the microfilm is made selectable between discrete values in accordance with the magnification of the manuscript. The photographing of the manuscript and the additional information is then effected in a chronological order.

7 Claims, 10 Drawing Figures

FIG.4A MEASURING

FIG.4B PRESSING / SUCKING

FIG.4C SHUTTER

FIG.4D ADDITIONAL INFORMATION

FIG.4E MOTOR 22

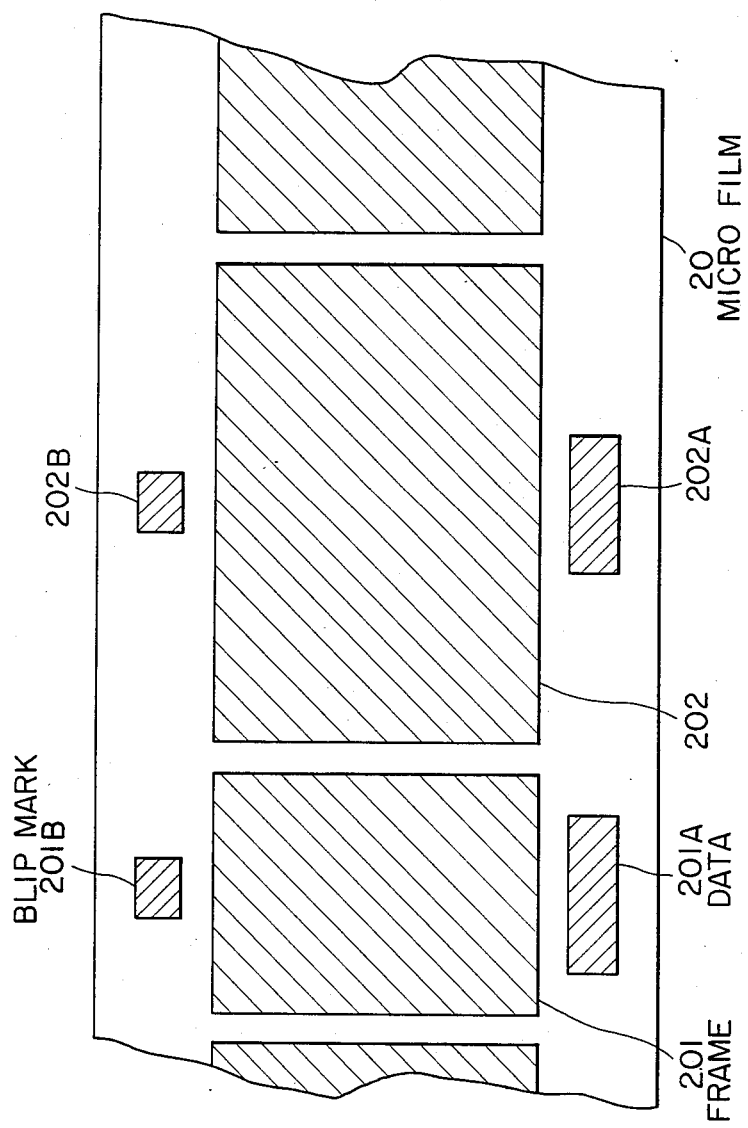

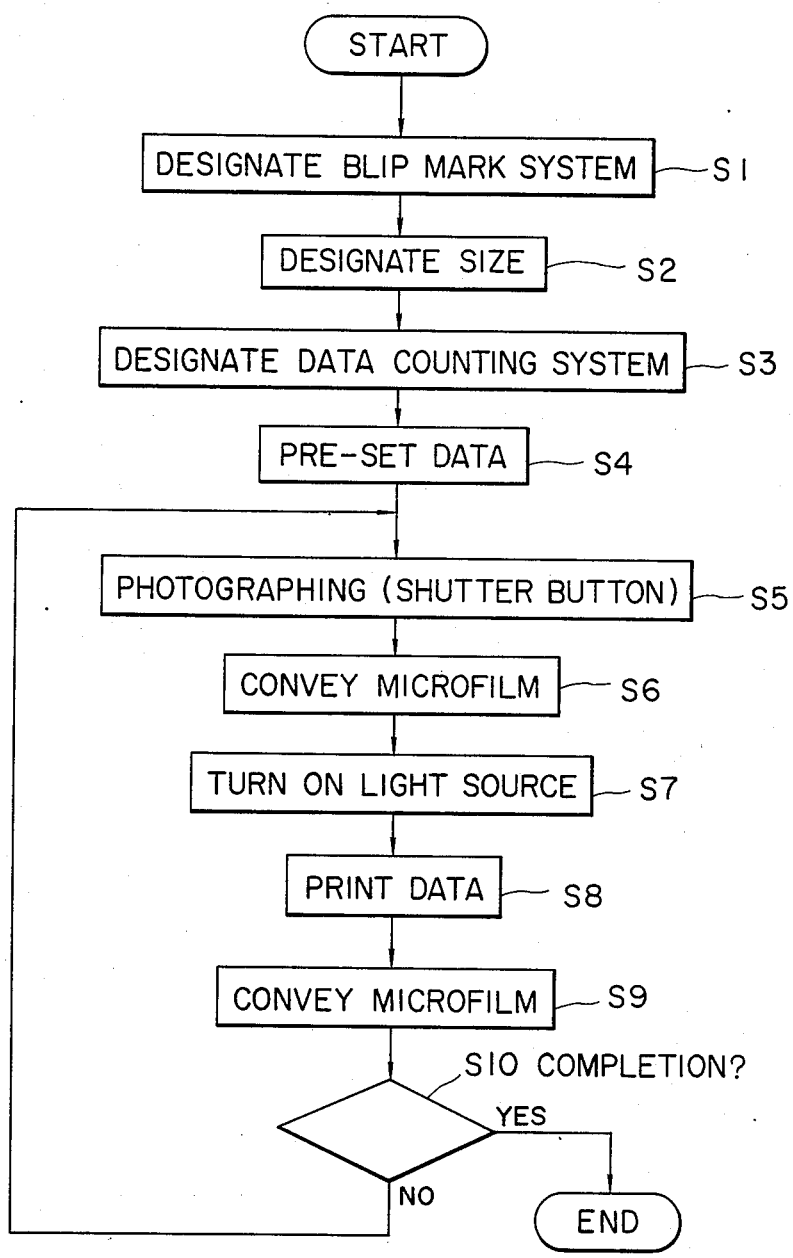

METHOD OF PHOTOGRAPHING ON MICROFILM AND APPARATUS THEREFOR

BACKGROUND OF THE INVENTION

This invention relates to a method of photographing on microfilm which permits simple imaging of additional information on microfilm for facilitating later retrieval thereof and the apparatus therefor.

As more and more information is needed in society, image processing technology is increasingly in demand for recording documents and reference materials in microfilm, retrieving them when necessary, and projecting the information in enlargement, or duplicating them in hard copy. FIG. 1 shows a widely used microfilm photographing apparatus wherein a camera 1 with a focusing lens 2 mounted on a supporting pole 3 moves up and down along the supporting pole 3 so as to include a manuscript (including documents, microfilm and so on) 6, placed on a table 7, within visional fields 4A and 4B. The camera 1 photographs the images at an appropriate magnification and focus to record the manuscript 6 microfilm frame by frame. Lights 5A and 5B, provided on both sides of the camera 1 and supported on a control box 8, are directed to the manuscript 6 so that the manuscript 6 is constantly illuminated with a given amount of light.

The microfilm recorded in the above manner should be stored in a systematic and easy-to-use manner to allow quick retrieval for effective use. In order to facilitate such systematic storage and later retrieval, it is necessary to record additional information in correspondence to each frame of images on the microfilm. Blip marks, serial numbers indicating frame number, dates of recording, etc. are generally used as such additional information which are conventionally provided on the table 7 at a location close to the manuscript 6 within the visual fields 4A and 4B. The additional information is photographed together with the manuscript 6. Figures in the additional information frame are replaced for recording images of each frame. This method, however, involves complicated operations such as replacing figures or characters for every recording. Morever, since the optical magnification changes depending on the size of manuscript or of film, the size of the recorded additional information of the microfilm becomes inconsistent if the characters of the same size are used. On the other hand, if the size of the characters is changed in correspondence to the size of manuscript, the operation becomes more complicated.

Another method has been proposed which rotates character gears interlockingly with the feeding of the microfilm in the camera 1 so that a serial number is photographed together with the manuscript. However, such character gears can be provided only at a predeterminded location in relation to the image frames, thereby presenting an inconvenience, especially when films of different sizes are used. The method has a disadvantage in that the character gears turn even if an unimaged frame is fed. Furthermore, since almost all retrieval apparatus has a fixed position on a frame for data for retrieval, one apparatus cannot be used universally for various types of retrieval apparatuses.

SUMMARY OF THE INVENTION

This invention was conceived in view of the above situation, and aims at providing a photographing method on microfilm which can generally be applied for various types of retrieval apparatus and which allows exposure of additional information with simple operations and an apparatus therefor.

According to this invention in one aspect thereof, for achieving objects described above, there is provided a method for photographing images on microfilm from a manuscript placed on a table together with additional data which is characterized in that the position of the manuscript for photographing is different from that of the additional information structurally, the size of the additional information on the microfilm is made selectable but not variable by the magnification of the manuscript, and the photographing of the manuscript and that of the additional information are interrelated to each other by a chronological order.

According to this invention in another aspect thereof, there is provided an apparatus for photographing images with a camera from a manuscript placed on a table which is characterized in that in additon to a first optical system for photographing the images of the manuscript, there is provided in the camera a second optical system comprising an additional information generator which generates additional information optically, an optical path controlling means which focuses the additonal information and images on the same microfilm, and masking plates which selectively expose the additional information alone at a predetermined position on the microfilm.

The nature, principle and utility of the invention will become more apparent from the following detailed description when read in conjunction with the accompanying drawings.

BRIEF DESCRIPTION OF THE DRAWINGS

In the accompanying drawings:

FIGS. 4A through 4E are timing charts to show operational modes thereof;

FIG. 5 is a view to show a microfilm printed according to this invention; and

FIG. 6 is a flow chart to show an example of the operation according to this invention method.

DETAILED DESCRIPTION OF THE INVENTION

Figure 1:
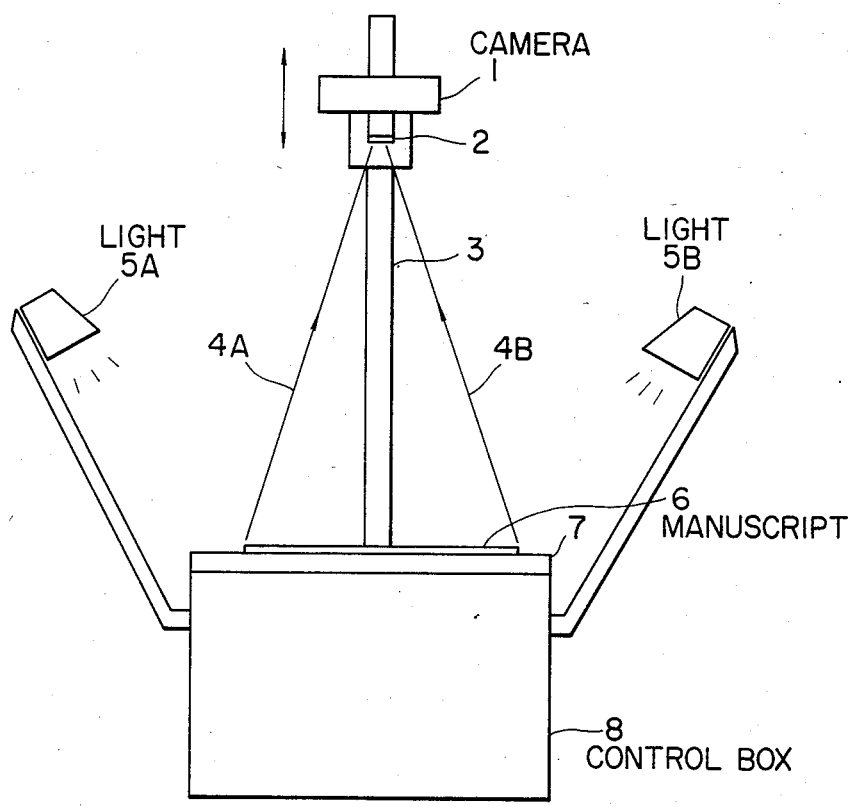
FIG. 1 is a schematic view of photographing apparatus for microfilm to which the present invention can be applied.
Figure 2:
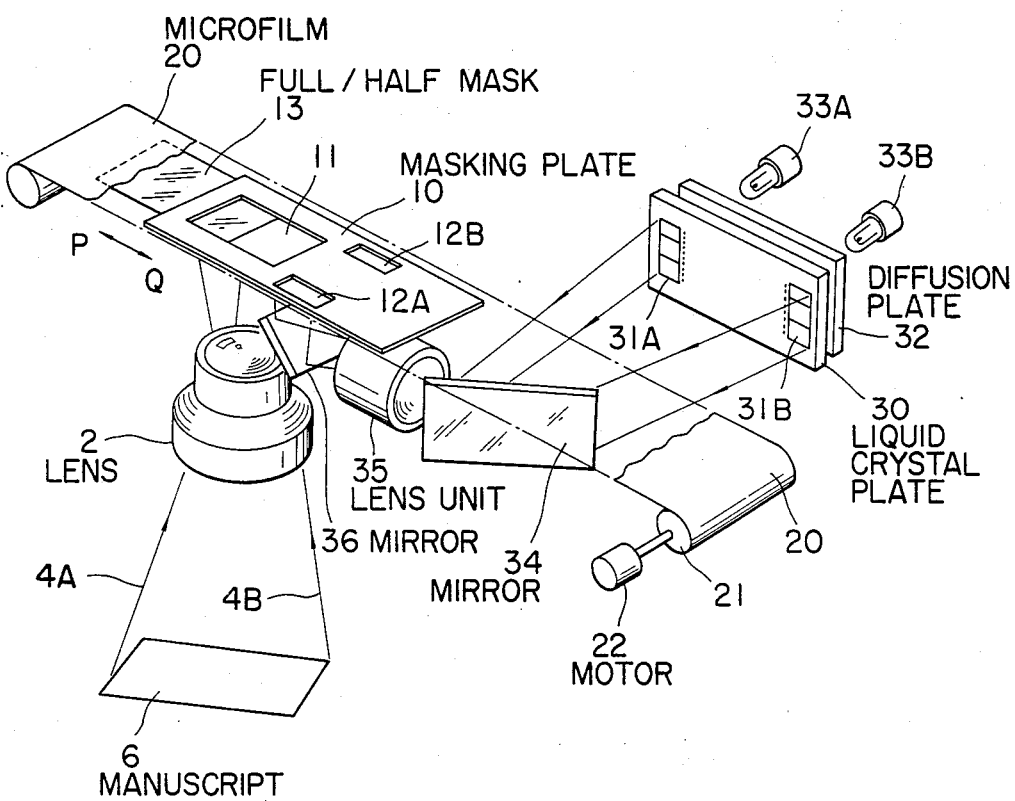
FIG. 2 is an optical view to show one embodiment of this invention.

FIG. 2 optically shows an embodiment of this invention wherein a masking plate 10 having a rectangular main aperture 11 and a pair of apertures for additional information 12A and 12B is provided in front of and close to a microfilm 20. At a location which is downstream from the masking plate 10 a full/half mask 13 is provided which is openable/closable in the directions P and Q to determine the size of the main aperture 11. When the manuscript 6 is focused by the lens 2 and a shutter button (described hereinafter) is pushed down, the microfilm 20 is exposed with light via the main aperture 11. The microfilm 20 is adapted to be coiled on roller 21 driven by a motor 22. When the images of the manuscript 6 are photographed on the microfilm, the microfilm is mechanically forced upward onto the masking plate 10 with a known pressing mechanism (not shown). The additional information corresponding to the recorded manuscript 6 is exposed with light on the microfilm 20 via the aperture 12A and 12B. More particularly, characters and figures are displayed in negative on the display units 31A and 31B of a liquid crystal plate 30. Light sources 33A and 33B are provided behind the liquid crystal plate 30 via a diffusion plate 32 while a mirror 34 is provided in front thereof. The light reflected from the mirror 34 is illuminated on a mirror 36 via lens unit 35 and the light reflected from the mirror 36 exposes the characters on the display units 31A and 31B via the apertures 12A and 12B onto the micrfilm 20.

Figure 3:
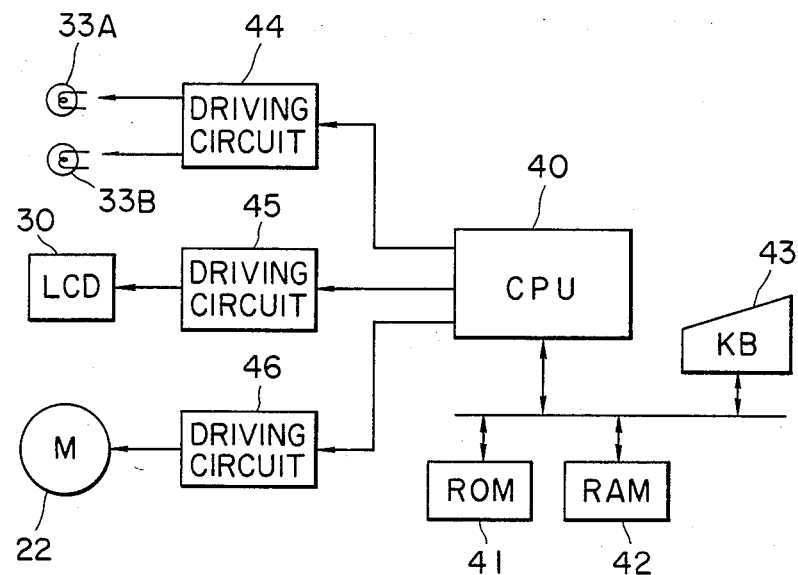
FIG. 3 is a block diagram to show the control system thereof.
Figure 3:
Figure 3:
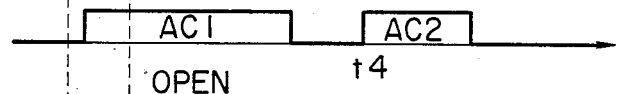
Figure 3:
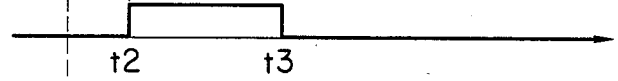
Figure 3:
Figure 3:
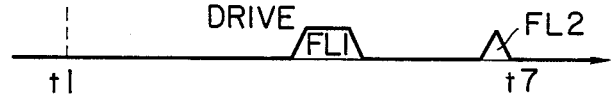

FIG. 3 shows the control system of the above optical system wherein a CPU 40 such as a microprocessor controls the whole system. A ROM 41 for program storage, a RAM 42 for data processing and a keyboard 43 for command input are connected to the CPU 40 via a bus line. The CPU 40 is further connected to the light sources 33A and 33B via a driving circuit 44, and to the liquid crystal plate 30 via driving circuit 45 and to the motor 22 via a driving circuit 46. The display units 31A and 31B of the liquid crystal plate 30 are respectively divided into three portions as shown in FIG. 2 which are driven by the driving circuit 45 as well as separately controlled by the CPU 40, and the light sources 33A and 33B are independently turned on and controlled.

The operation of the apparatus with above mentioned structure will now be described referring to the timing chart shown in FIGS. 4A through 4E.

FIG. 4A through 4E show the exposing procedure for one frame chronologically from the start time point t1 to the completion time point t7. When the operation starts at the time point t1 as commanded from the keyboard 43, a photo sensor (not shown) photometrically measures the manuscript 6 by the time point t2 as shown in FIG. 4A, and the exposure is determined based on the photometric data. Meanwhile, the microfilm 20 is forced upon the masking plate 10 by a pressing/sucking operation (AC1), which is conducted to effect focusing as shown in FIG. 4B. More specifically, such operation is conducted by a known pressing mechanism which mechanically presses the microfilm from above and by known suction mechanism which sucks the microfilm onto the masking plate 10 by means of an air pressure of an air pump. After the time point t2 on the completion of the photometric measurement, a shutter (not shown) is opened and during the period from the time point t2 to the time point t3 in FIG. 4C, the microfilm 20 is exposed with the images of the manuscript 6. The full-/half mask 13 is controlled positionally in advance, thereby determining the size of the main aperture 11 as full size or a half size. The images of the manuscript 6 are focused at a predetermined position on the microfilm 20 in a predetermined size and then exposed. When the shutter is closed to complete exposure at the time point t3, the operation AC1 of pressing and sucking the microfilm 20 ends and the motor 22 is activated via the CPU 40 (FL1 of FIG. 4E) and the microfilm 20 is wound on the roller 21. When the portion of the microfilm which has just been recorded comes at the center of the apertures 12A and 12B, the microfilm 20 is suspended and the pressing/sucking operation similar to the above is conducted from the time point t4 during the period AC2. During the operation AC2, the additional information relevant to the manuscript 6 is display on the display units 31A and 31B of the liquid crystal plate 30 via the CPU 40 and the driving circuit 45 while the light sources 33A and 33B are turned on via the CPU 40 and the driving circuit 44. The displayed data is reflected by the mirror 34, inputted to the lens unit 35, reflected again by the mirror 36 and exposed on the microfilm 20 via the apertures 12A and 12B (time points t5 to t6). The additional information is exposed at positions above and below the already exposed images of the manuscript 6. The microfilm 20 is moved by a predetermined length to finish the photographing operation for one frame and to prepare for the next manuscript as shown in FIG. 4E with FL2.

FIG. 5 shows an example of the microfilm print which is imaged in the above mentioned manner wherein the images in a frame 201 are exposed in half-size while information on data 201A and a blip mark 201B are printed above and below the images in the frame 201. Similarly, the images in a frame 202 are exposed in full-size with data 202A and a blip mark 202B respectively printed. In this example, the information 201A and 202A and blip marks 201B and 202B are positioned substantially at center of the frames 201 and 202. They may arbitrarily be positioned by adjusting the feeding amount of the microfilm. The size of the information or of the blip marks may be arbitrarily varied by controlling the driving circuit 45 via the CPU 40.

This invention apparatus is operated in accordance with the flow chart shown in FIG. 6.

When the operation starts, a blip mark system is designated (Step S1), and commands are inputted to indicate how many portions out of the three portions allocated to each display units 31A and 31B, which will be also used to designate the size of the marks. The frame size to be exposed is designated by driving the full/half mask 13 (Step S2), and the counting system for information is designated. More particularly, if the data relates to date, it is not necessary to change the data throught a day, a period in which most of exposing operation is completed, but if the data is a serial number, it should be renewed or added by one for each frame (Step S3). Then, the initial value of the data (for instance, if the data is date, it may be "84.10.22" and if the data is a serial number, it may be "00001") is pre-set (Step S4). Thus, the format of the microfilm is determined so as to complete the preparation. The shutter button on the keyboard 43 is pushed (Step S5). The motor 22 is actuated via the CPU 40 and the driving circuit 46 to convey microfilm 20 by a predetermined length (Step S6). The light sources 33A and 33B are turned on via the driving circuit 44 (Step S7). This makes the content of the display units 31A and 31B to be exposed with light (Step S8). Finally, the microfilm 20 is advanced by a predetermined length for the next photographing operation (Step S9). Then, whether or not the operation is completed is judged (Step S10), and if it is not completed, the procedure will return to Step S5 to repeat an operation similar to the above.

Although a combination of a liquid crystal plate and light sources is described as an additional information generator in the above explanation, it may be replaced with an LED (light emitting diode) element, an EL (electroluminescence) plate, or a CRT display. The display of the additional information is described by means of two mirrors in the above, but it is structurally possible to the use only one mirror. Alternatively, the additional information may be directly exposed on the microfilm surface through a lens without using mirrors.

As described in detail in the foregoing statement, this invention permits information data or blip marks to be generated and exposed at an arbitrary position in correspondence with the frame images within a camera head. This invention also allows exposure of such data or marks at a predetermined position with a predetermined size irrespective of the size or the density of manuscript. As one microfilm photographing apparatus can be adapted universally for vaious formats, this invention can achieve high efficiency with a simple structure. This invention apparatus does not require complex mechanical manipulation but is operated wholly with electrical control to achieve simple but effective operation at a low cost.

It should be understood that many modifications and adaptations of the invention will become apparent to those skilled in the art and it is intended to encompass such obvious modifications and changes in the scope of the claims appended hereto.

What is claimed is:

1. An apparatus for photographing images with a camera from the manuscript placed on a table, which comprises:
   an additional information generator which comprises a liquid crystal plate and two light sources provided behind said liquid crystal plate and a driving means for driving said liquid crystal plate so as to thereby optically generate additional information;
   an optical path controlling means which comprises a first mirror which receives said additional information, a lens which focuses light reflected from said first mirror and a second mirror which reflects light transmitted from said lens into a microfilm so as to thereby focus said additional information and photograph said additional information on said microfilm; and
   mask plates which are placed betwen said microfilm and said optical path controlling means so as to thereby selectively expose said additional information alone at a predetermined position on said microfilm.

2. An apparatus as claimed in claim 1, wherein a diffusion plate is placed between said liquid crystal plate and said light source.

3. An apparatus as claimed in claim 1, wherein said liquid crystal plate is rectanglar and is provided with rectangular display units on both sides thereof.

4. An apparatus as claimed in claim 3, wherein said display units are respectively divided into three portions.

5. An apparatus for photographing images with a camera from the manuscript placed on a table, which comprises:
   an additional information generator which comprises a rectangular liquid crystal plate and two light sources provided behind end portions of said liquid crystal plate and a driving means for driving said liquid crystal plate so as to thereby optically generate additional information;
   a first mirror for receiving said additional information optically generated by said information generator and for reflecting said additional information in a direction perpendicular thereto;
   a lens for focusing light reflected from said first mirror;
   a second mirror for reflecting light transmitted from said lens in a direction perpendicular thereto and for illuminating a microfilm so as to thereby focus said additional information and photograph said additional information on said microfilm, and
   mask plates which are placed between said microfilm and said second mirror for selectively exposing said additional information alone at a predetermined position on said microfilm.

6. An apparatus as claimed in claim 5, further comprising a diffusion plate disposed between said liquid crystal plate and said light sources.

7. An apparatus as claimed in claim 5, wherein said liquid crystal plate comprises two rectangular display units which are respectively divided into three portions.

* * * * *